United States Patent
Turco et al.

(10) Patent No.: US 7,219,499 B2
(45) Date of Patent: May 22, 2007

(54) METHODS AND APPARATUS FOR OPERATING GAS TURBINE ENGINES

(75) Inventors: John B. Turco, West Chester, OH (US); Gary Craig Wollenweber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/470,535

(22) Filed: Sep. 6, 2006

(65) Prior Publication Data
US 2007/0022739 A1    Feb. 1, 2007

Related U.S. Application Data

(60) Division of application No. 10/799,523, filed on Mar. 12, 2004, now Pat. No. 7,121,078, which is a continuation-in-part of application No. 10/352,446, filed on Jan. 28, 2003, now Pat. No. 6,968,674.

(51) Int. Cl.
*F02C 6/00*    (2006.01)
(52) U.S. Cl. .................................................. 60/772
(58) Field of Classification Search ............... 60/39.15, 60/39.27, 224, 225, 226.1, 263, 264, 772
See application file for complete search history.

(56) References Cited

U.S. PATENT DOCUMENTS

| | | | |
|---|---|---|---|
| 3,965,673 A | 6/1976 | Friedrich | |
| 3,971,208 A | 7/1976 | Schwent | |
| 4,192,137 A | 3/1980 | Chappell et al. | |
| 4,631,914 A | 12/1986 | Hines | |
| 5,160,080 A | 11/1992 | Hines et al. | |
| 6,457,305 B1 | 10/2002 | Schierbaum | |
| 6,634,596 B2 | 10/2003 | Albero et al. | |
| 6,868,664 B2 | 3/2005 | Albero et al. | |
| 6,968,674 B2 | 11/2005 | Wollenweber | |
| 7,121,078 B2 | 10/2006 | Turco et al. | |

FOREIGN PATENT DOCUMENTS

GB    2074654    * 11/1981

* cited by examiner

*Primary Examiner*—L. J. Casaregola
(74) *Attorney, Agent, or Firm*—William Scott Andes Armstrong Teasdale LLP

(57) ABSTRACT

A method facilitates assembling a gas turbine engine assembly. The method comprises providing at least one propelling gas turbine engine that includes a core engine including at least one turbine. The method also comprises coupling an auxiliary engine to the propelling gas turbine engine such that during operation of the propelling gas turbine engine, at least a portion of the airflow entering the propelling gas turbine engine is extracted from the propelling gas turbine engine upstream from the core engine turbine, and channeled to the auxiliary engine for generating power.

12 Claims, 1 Drawing Sheet

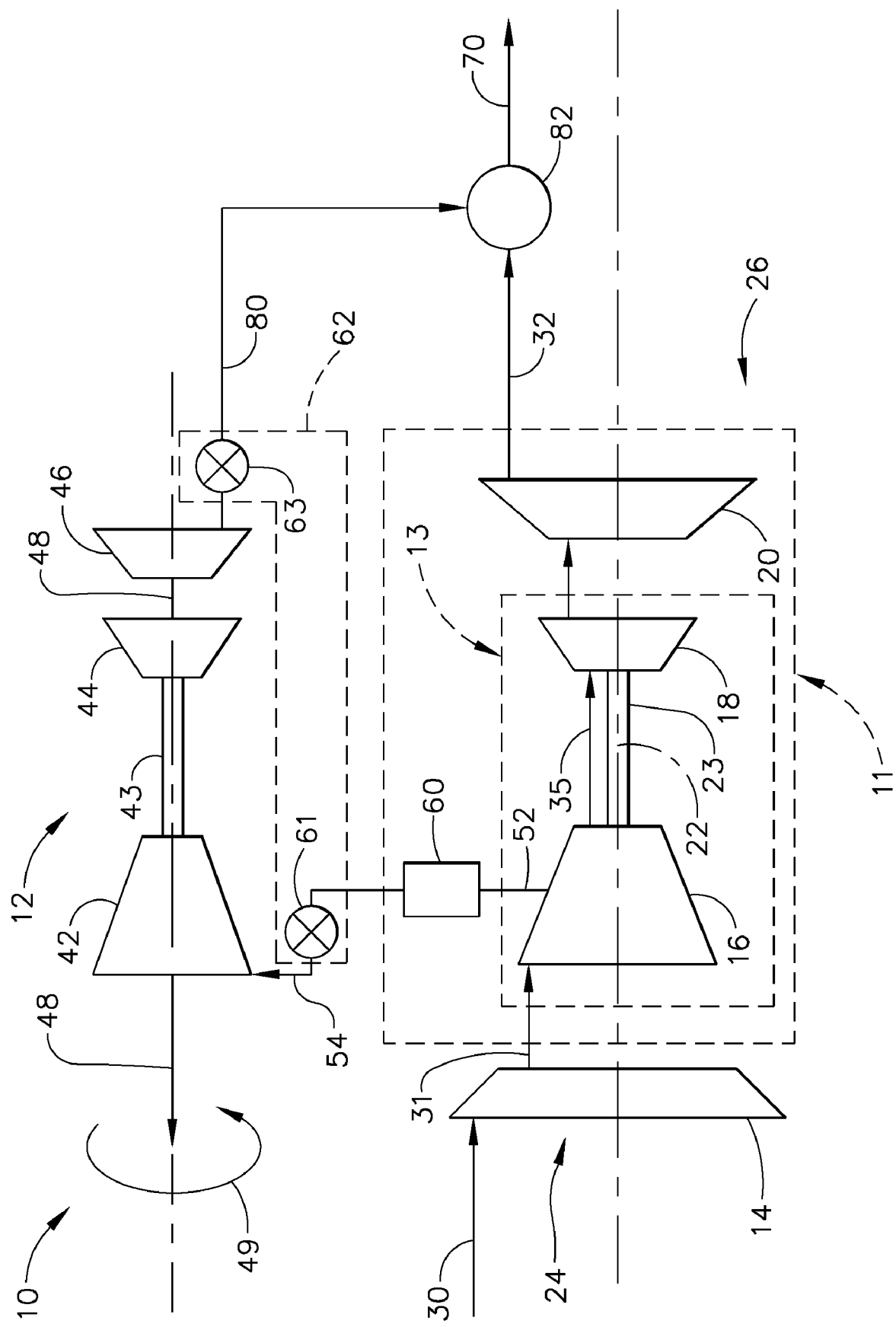

METHODS AND APPARATUS FOR OPERATING GAS TURBINE ENGINES

CROSS-REFERENCE TO RELATED APPLICATIONS

This application is a divisional application of U.S. patent application Ser. No. 10/799,523, filed Mar. 12, 2004; now U.S. Pat. No. 7,121,078 which is a continuation-in-part of U.S. patent application Ser. No. 10/352,446, filed Jan. 28, 2003, now U.S. Pat. No. 6,968,674 which is hereby incorporated by reference and is assigned to assignee of the present invention.

BACKGROUND OF THE INVENTION

This invention relates generally to the gas turbine engines, and, more particularly, to methods and apparatus for operating gas turbine engines used for aircraft propulsion and auxiliary power.

Gas turbine engines typically include a compressor for compressing air. The compressed air is mixed with a fuel and channeled to a combustor, wherein the fuel/air mixture is ignited within a combustion chamber to generate hot combustion gases. The combustion gasses are channeled to a turbine, which extracts energy from the combustion gases for powering the compressor, as well as producing useful work. The exhaust gases are then discharged through an exhaust nozzle, thus producing a reactive, propelling force.

Modem aircraft have increased hydraulic and electrical loads. An electrical load demanded of gas turbine engines increases as flight computers, communication equipment, navigation equipment, radars, environmental control systems, advanced weapon systems, and defensive systems are coupled to aircraft. A hydraulic load demanded of gas turbine engines increases as flight controls, pumps, actuators, and other accessories are coupled to the aircraft. Within at least some known aircraft, mechanical shaft power is used to power hydraulic pumps, electrical generators and alternators. More specifically, electrical and hydraulic equipment are typically coupled to an accessory gearbox that is driven by a shaft coupled to the turbine. When additional electrical power or hydraulic power is required, additional fuel is added to the combustor until a predefined maximum temperature and/or power operating level is reached.

Because the density of air decreases as the altitude is increased, when the aircraft is operated at higher altitudes, the engine must work harder to produce the same shaft power that the engine is capable of producing at lower altitudes. As a result of the increased work, the turbine may operate with increased operating temperatures, such that the shaft power must be limited or reduced to prevent exceeding the engine predefined operating limits.

Within at least some known gas turbine engines, electrical power and hydraulic power is also generated by an auxiliary power unit (APU). An APU is a small turbo-shaft engine that is operated independently from the gas turbine engines that supply thrust for the aircraft. More specifically, because APU operation is also impacted by the air density and is also operationally limited by predefined temperature and performance limits, APUs are typically only operated when the aircraft is on the ground, or in emergency situations while the aircraft is in flight.

BRIEF DESCRIPTION OF THE INVENTION

In one aspect, a method for assembling a gas turbine engine assembly is provided. The method comprises providing at least one propelling gas turbine engine that includes a core engine including at least one compressor, one combustor, and at least one turbine. The method also comprises coupling an auxiliary engine to the propelling gas turbine engine such that during operation of the propelling gas turbine engine, at least a portion of the airflow entering the propelling gas turbine engine is extracted from the propelling gas turbine engine upstream from the core engine turbine, and channeled to the auxiliary engine for generating power.

In another aspect, a gas turbine engine assembly is provided. The gas turbine engine assembly comprises at least one propelling gas turbine engine and at least one auxiliary engine. The at least one propelling gas turbine engine includes a fan and a core engine downstream from the fan. The auxiliary engine is used for generating power, and includes at least one inlet and at least one turbine. The inlet is coupled in flow communication with the propelling gas turbine engine core engine, such that a portion of airflow entering said core engine is channeled for use by the auxiliary engine, and wherein the propelling gas turbine engine generates thrust for the gas turbine engine assembly.

In a further aspect, an aircraft gas turbine engine assembly is provided. The gas turbine engine assembly includes at least one propelling gas turbine engine and at least one auxiliary engine. The propelling gas turbine engine includes a core engine including at least one turbine. The propelling gas turbine engine is used for generating thrust for the aircraft. The auxiliary engine includes an inlet, at least one turbine, and an exhaust, wherein the inlet is coupled in flow communication with the propelling gas turbine engine, such that a portion of airflow flowing through the propelling engine is extracted from the propelling engine upstream from the propelling engine turbine and is channeled to the auxiliary engine for generating power.

BRIEF DESCRIPTION OF THE DRAWINGS

FIG. 1 is an exemplary schematic view of a gas turbine engine assembly.

DETAILED DESCRIPTION OF THE INVENTION

FIG. 1 is an exemplary schematic view of a gas turbine engine assembly 10 including a propelling gas turbine engine 11 and an auxiliary power unit or auxiliary power engine 12 that are coupled together, as described in more detail below, in a combined cycle. More specifically, gas turbine engine assembly 10, as described in more detail below, facilitates producing shaft power and propelling force for an aircraft (not shown).

Gas turbine engine 11 includes a core engine 13 and a fan assembly 14 and a low pressure turbine assembly 20. Core engine 13 includes a high-pressure compressor 16, a combustor (not shown), and a high-pressure turbine 18. Fan assembly 14 and turbine 20 are coupled by a first shaft 22, and compressor 16 and turbine 18 are coupled by a second shaft 23. Gas turbine engine 11 also includes an inlet side 24 and an exhaust side 26. In one embodiment, engine 11 is a F118-GE-100 turbofan engine commercially available from General Electric Aircraft Engines, Cincinnati, Ohio.

In operation, inlet air, represented by arrow 30, enters fan assembly 14, wherein the air is compressed and is discharged downstream, represented by arrow 31, at an increased pressure and temperature towards core engine 13 and more specifically, towards high-pressure compressor 16. In one embodiment, engine 11 includes a bypass duct (not shown) such that a portion of air 31 discharged from fan assembly 14 is also channeled into the bypass duct rather than entering core engine 11.

Highly compressed air 35 is delivered to a combustor (not shown) wherein it is mixed with fuel and ignited. Combustion gases propel turbines 18 and 20, which drive compressor 16 and fan assembly 14, respectively. In the exemplary embodiment, core engine exhaust 32 is discharged from engine to generate a propelling force from gas turbine engine assembly 10. In the exemplary embodiment, core engine exhaust 32 is channeled to a variable area bypass injector 82 that is coupled in flow communication with core engine exhaust 32 and auxiliary engine exhaust 80. In an alternative embodiment, core engine exhaust 32 is channeled to a mixing damper (not shown) that is coupled in flow communication with core engine exhaust 32. In another alternative embodiment, core engine exhaust flow and fan air are discharged separately from auxiliary engine exhaust 80 to produce thrust.

Auxiliary power engine 12 is coupled in flow communication to engine 11, as described in more detail below, and includes a compressor 42, a high-pressure turbine 44, and a low-pressure turbine 46. Compressor 42 and high-pressure turbine 44 are connected by a first shaft 43 such that as combustion gases propel turbine 44, turbine 44 drives compressor 42. Auxiliary engine 12 also includes a second shaft 48 coupled to low-pressure turbine 46 which provides shaft power output, represented by arrow 49, for use in the aircraft. Power output 49 may be used to drive equipment, such as, but not limited to alternators, generators, and/or hydraulic pumps. In one embodiment, auxiliary power engine 12 is a turbo-shaft engine, such as a T700-GE-701 engine that is commercially available from General Electric Company, Cincinnati, Ohio, and that has been modified in accordance with the present invention.

Auxiliary ducting (not shown) couples auxiliary power engine 12 to engine 11 to enable a portion of air 31 channeled towards core engine 13 to be directed to auxiliary power engine 12. More specifically, auxiliary airflow, represented by arrow 52 is extracted from core engine 13 at a location upstream from core engine turbine 18. In the exemplary embodiment, airflow 52 is bled from high-pressure compressor 16 and is routed towards auxiliary engine compressor 42. In an alternative embodiment, auxiliary power engine 12 is coupled in flow communication to a pair of engines 11 and receives high pressure airflow 54 from each engine 11. In another alternative embodiment, a pair of auxiliary power engines 12 are coupled in flow communication to a single engine 11 and both receive high pressure airflow 54 from engine 11. More specifically, in the exemplary embodiment, compressor 16 is a multi-staged compressor and air 52 may be extracted at any compressor stage based on pressure, temperature, and flow requirements of auxiliary engine 12. In another embodiment, air 52 is extracted downstream from compressor 16. In a further alternative embodiment, air 52 is extracted upstream from compressor 16. In one embodiment, approximately up to 10%, or more, of air flowing into compressor 16 is extracted for use by auxiliary engine 12. In a further embodiment, air 52 is extracted from any of, but is not limited to being extracted from, a booster interstage, a booster discharge, a fan interstage, a fan discharge, a compressor inlet, a compressor interstage, or a compressor discharge bleed port. In another embodiment, approximately up to 10% or more, of air flowing into fan 14 is extracted for used by auxiliary engine 12.

In an alternative embodiment, engine 11 supplies pressurized or compressed air to auxiliary power engine 12. For example, in one embodiment, compressed air supplied to an aircraft cabin is routed to auxiliary power engine 12 after being used within the aircraft environmental control system. In a further embodiment, auxiliary power engine 12 receives a mixture of airflow from engine 11 and ambient airflow.

Auxiliary airflow 54 directed towards auxiliary engine 12 is at a higher pressure and temperature than airflow 30 entering gas turbine engine assembly 10. Moreover, because the auxiliary airflow 30 is at an increased pressure and temperature than that entering gas turbine engine assembly 10, a density of airflow 54 is substantially similar to the density of airflow that enters auxiliary engine 12 at lower altitudes. Accordingly, because the power output of auxiliary engine 12 is proportional to the density of the inlet air, during operation of core engine 11, auxiliary engine 12 is operable at higher altitudes with substantially the same operating and performance characteristics that are available at lower altitudes by auxiliary engine 12. For example, when used with the F110/F118 family of engines, auxiliary engine 12 produces approximately the same horsepower and operating characteristics at an altitude of 30–40,000 feet, as would be obtainable if auxiliary engine 12 was operating at sea level independently. Accordingly, at mission altitude, a relatively small amount of high-pressure air taken from core engine 11 will enable auxiliary power engine 12 to output power levels similar to those similar from auxiliary power engine 12 at sea level operation.

In the exemplary embodiment, auxiliary airflow 52 is channeled through an intercooler 60 prior to being supplied to auxiliary engine compressor 42. Intercooler 60 has two airflows (not shown) in thermal communication with each other and is designed to exchange a substantial amount of energy as heat, with minimum pressure losses. In the exemplary embodiment, auxiliary airflow 52 is the heat source and a second airflow is used as a heat sink. In one embodiment, the second airflow is fan discharge airflow. In another embodiment, the second airflow is ambient airflow routed through an engine nacelle and passing through intercooler 60 prior to being discharged overboard. More specifically, the operating temperature of auxiliary airflow 54 is facilitated to be reduced within intercooler 60 as the transfer of heat increases the temperature of the other airflow channeled through intercooler 60. In an alternative embodiment, turbine engine assembly 10 does not include intercooler 60.

Intercooler 60 facilitates increasing an amount of power per pound of bleed air 54 supplied to auxiliary power engine 12 without increasing flow rates or changing existing turbine hardware. A control system 62 is coupled to a generator control system (not shown) and facilitates regulating the operating speed of auxiliary power engine 12. In one embodiment, control system 62 throttles inlet air 52 supplied to engine 12 by control of a variable flow area throttle valve 61 and/or controls engine backpressure by control of a variable flow area exit nozzle 63 or a variable area bypass injector 82 to facilitate controlling the operation of auxiliary power engine 12.

Exhaust airflow 80 from auxiliary power engine 12 is channeled towards core engine exhaust 32 at a discharge pressure that is substantially the same as a discharge pressure of exhaust flow 32 discharged from core engine 13.

Specifically, in the exemplary embodiment, auxiliary engine exhaust airflow 80 is routed through a variable area bypass injector 82 which facilitates mixing exhaust flow 32 exiting core engine 13 with auxiliary engine exhaust airflow 80. More specifically, in the exemplary embodiment, exhaust airflow 80 is reintroduced to core engine exhaust flow 32 upstream from a propelling core engine nozzle (not shown). The mixed exhaust flow 86 is then discharged through an engine nozzle (not shown). In an alternative embodiment, exhaust airflow 80 is not mixed with core engine exhaust flow 32, but rather is discharged independently from exhaust flow 32.

Accordingly, when operated, auxiliary power engine 12 facilitates providing increased shaft power production for use within the aircraft. More specifically, because auxiliary power engine 12 is selectively operable for shaft power production, auxiliary power engine 12 may be used only when needed, thus facilitating fuel conservation for the aircraft. In addition, the design of gas turbine assembly 10 enables auxiliary power engine 12 to be operated independently of propelling engine 11, such that an operating speed auxiliary power engine 12 is independent of an operating speed of core engine 11. As such, auxiliary power engine 12 may operated during non-operational periods of core engine 11, and moreover, may be used to provide power necessary to start operation of engine 11.

Operation of auxiliary power engine 12 facilitates improving surge margin of engine 11 by bleeding airflow 52 as needed, such that altitude, installation, or distortion effects may be overcome. Moreover, by removing high pressure extraction, auxiliary power engine 12 also facilitates improving an operating performance of core engine 11 while generating significant power. Additionally the hydro mechanical or digital controls of propelling engine 11 and auxiliary power engine 12 are arranged to mutually exchange operational status and performance parameter values (pressure, temperature, RPM, etc) from one to the other.

The above-described power system is cost-effective and increases shaft power production. The power system includes an auxiliary turbine engine coupled in flow communication with a gas turbine engine such that inlet air provided to the auxiliary turbine is drawn from air flowing through the core engine. As such, higher density air is provided to the auxiliary engine than would be provided had the auxiliary engine received ambient inlet airflow through conventional means, such as through normally aspired means. Accordingly, a small amount of high-pressure air taken from the main engine will enable a smaller engine to output power levels similar to those of sea level operation. As a result, the increased density of air facilitates increased shaft turbine power production from the auxiliary engine in a cost-effective and reliable manner Exemplary embodiments of gas turbine assemblies are described above in detail. The assemblies are not limited to the specific embodiments described herein, but rather, components of each assembly may be utilized independently and separately from other components described herein. For example, each turbine component and/or auxiliary turbine engine component can also be used in combination with other core engine and auxiliary turbine engine components.

While the invention has been described in terms of various specific embodiments, those skilled in the art will recognize that the invention can be practiced with modification within the spirit and scope of the claims.

What is claimed is:

1. A method for assembling a gas turbine engine assembly, said method comprising:
providing at least one propelling gas turbine engine that includes a core engine including at least one turbine;
coupling an auxiliary engine to the propelling gas turbine engine such that during operation of the propelling gas turbine engine, at least a portion of the airflow entering the propelling gas turbine engine is extracted from the propelling gas turbine engine upstream from the core engine turbine, and channeled to the auxiliary engine for generating power; and
coupling an intercooler between the propelling engine and the auxiliary engine inlet such that airflow channeled to the auxiliary engine from the propelling engine is channeled through the intercooler before entering the auxiliary engine.

2. A method in accordance with claim 1 wherein coupling an auxiliary engine to the propelling gas turbine engine further comprises coupling the auxiliary engine to the propelling gas turbine engine such that during operation of the propelling gas turbine engine, the airflow channeled to the auxiliary engine from the propelling engine is at a higher pressure than a pressure of the airflow entering the propelling gas turbine engine.

3. A method in accordance with claim 1 wherein coupling an auxiliary engine to the propelling gas turbine engine further comprises coupling the auxiliary engine to the propelling gas turbine engine such that during operation of the propelling gas turbine engine, the airflow channeled to the auxiliary engine from the propelling engine is at a higher temperature than a temperature of the airflow entering the propelling gas turbine engine.

4. A method in accordance with claim 1 wherein coupling an auxiliary engine to the propelling gas turbine engine further comprises coupling the auxiliary engine to the propelling gas turbine engine such that during operation of the propelling gas turbine engine, the airflow channeled to the auxiliary engine from the propelling engine is at a higher density than a density of the airflow entering the propelling gas turbine engine.

5. A method in accordance with claim 1 wherein coupling an auxiliary engine to the propelling gas turbine engine further comprises coupling the auxiliary engine to the propelling gas turbine engine such that operation of the auxiliary engine facilitates generating increased shaft horsepower during operation of said gas turbine engine assembly.

6. A method in accordance with claim 1 further comprising coupling either a variable area bypass injector or a mixing damper to the auxiliary engine and to the propelling gas turbine engine such that exhaust discharged from the auxiliary and propelling gas turbine engines flows through the mixing damper or the variable area bypass injector.

7. A method in accordance with claim 1 wherein coupling an auxiliary engine to the propelling gas turbine engine further comprises coupling a control system to the auxiliary engine such that the auxiliary engine is controlled independently of the operation of the propelling gas turbine engine.

8. A method in accordance with claim 1 wherein coupling an auxiliary engine to the propelling gas turbine engine further comprises coupling the auxiliary engine to the propelling gas turbine engine such that exhaust is discharged from the auxiliary engine independently from exhaust discharged from the propelling gas turbine engine.

9. A method in accordance with claim 1 wherein coupling an auxiliary engine to the propelling gas turbine engine further comprises coupling the auxiliary engine to the propelling gas turbine engine such that during operation of the gas turbine engine assembly, the auxiliary engine facilitates enhancing a surge margin of the propelling engine.

10. A method in accordance with claim 1 wherein coupling an auxiliary engine to the propelling gas turbine engine further comprises coupling the auxiliary engine to the propelling gas turbine engine such that during operation of the gas turbine engine assembly, the auxiliary engine facilitates improving the operating performance of the propelling engine.

11. A method in accordance with claim 1 further comprising coupling a control system to the auxiliary engine to facilitate controlling an operational speed of the auxiliary engine.

12. A method in accordance with claim 1 wherein coupling a control system to the auxiliary engine further comprises coupling a control system including at least one adjustable air throttle valve to the auxiliary engine.

* * * * *